United States Patent Office 3,164,589
Patented Jan. 5, 1965

3,164,589
PROCESS FOR THE PREPARATION OF 1,2,4-BENZOTHIADIAZINE-1,1-DIOXIDES
James M. Sprague, Gwynedd Valley, Pa., assignor to Merck & Co., Inc., Rahway, N.J., a corporation of New Jersey
No Drawing. Filed Apr. 7, 1961, Ser. No. 101,332
3 Claims. (Cl. 260—243)

This invention is concerned with a novel process for the preparation of 1,2,4-benzothiadiazine-1,1-dioxides. In particular, this invention relates to the preparation of 1,2,4-benzothiadiazine-1,1-dioxides by reaction between chloral and a disulfamylaniline compound having at least one sulfamyl group in ortho-position to the amino group.

It was surprisingly found as a feature of this invention that when chloral is reacted with a disulfamylaniline compound of the type described above in the presence of a basic catalyst that cyclization occurs forming the corresponding 1,2,4-benzothiadiazine-1,1-dioxide in high yields.

In accordance with the process of this invention, the selected disulfamylaniline compound is preferably heated with chloral in the presence of a trace of a weak base.

While it is important that chloral be employed in this process, it can be used in any of its active forms such as chloral itself or chloral hydrate or chloral alcoholate can be used if desired.

The reaction advantageously is carried out in the presence of a solvent for the disulfamylaniline compound; dimethylformamide or dimethylacetamide being quite suitable solvents for this purpose.

Basic conditions are obtained advantageously by adding a trace of any of the conventional weak bases. Potassium fluoride, sodium or potassium hydroxide, tertiary amines and the like have been found to be especially suitable for this purpose.

Following the reaction, the reaction mixture can be worked up in any of the conventional ways to separate the 1,2,4-benzothiadiazine-1,1-dioxide compound from the solvent.

The process of this invention has been found to be especially well suited to the preparation of 1,2,4-benzothiadiazines which contain one sulfamyl substituent attached to the benzenoid moiety of the nucleus and which additionally contain at least one other substituent such as a halogen, a halogen-like radical or an alkyl, alkoxy, nitro or similar radical attached to the benzenoid portion of the nucleus. Substituents lso can be attached to one of the nitrogens in either the 2- or 4-position of the benzothiadiazine nucleus of the products produced by this novel process. The 1,2,4-benzothiadiazine-1,1-dioxide compounds prepared by the process of this invention which contain a sulfamyl substituent and at least one other substituent attached to the benzenoid portion of the structure are useful, inter alia, as diuretic and/or saluretic agents. Among this group of compounds, those possessing an especially high order of effectiveness are compounds having the structure

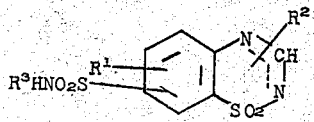

wherein $R^1$ represents halogen or a halogen-like radical as chlorine, bromine, fluorine, trihalomethyl as trifluoromethyl, trichloromethyl and the like, a lower alkyl radical advantageously having from 1 to 5 carbon atoms, a lower alkoxy radical preferably having 1 to 5 carbon atoms or a nitro-group; $R^2$ is attached to either the 2- or 4-position nitrogen atom and is hydrogen or a lower alkyl radical preferably having from 1 to 5 carbon atoms; and $R^3$ is hydrogen or a lower alkyl radical advantageously having from 1 to 5 carbon atoms.

While the foregoing structure illustrates a group of compounds which can be prepared by the process of this invention, the novel process described herein can be employed to give any desired 1,2,4-benzothiadiazine-1,1-dioxide compound.

The process of this invention is more fully described in the following examples. It is to be understood, however, that the examples are illustrative of the various compounds that can be prepared by the process of this invention and of the various conditions under which the reaction can be successfully carried out; and they are not to be construed as limiting the invention to the preparation of the particular compounds specifically described or to the particular conditions employed, it being critical only that the reaction between the disulfamylaniline and the selected chloral be conducted in the presence of a trace of weak base to provide high yields of the desired 1,2,4-benzothiadiazine-1,1-dioxide compounds.

EXAMPLE 1

A solution of 1.4 g. (0.04 mole) of 5-chloro-2,4-disulfamylaniline in 60 ml of dimethylformamide, 17.6 g. (0.12 mole) of chloral and 4.6 g. (0.08 mole) of anhydrous potassium fluoride is heated on the steam bath for 3 hours. Water (100 ml.) is added and the semisolid product is reprecipitated from dilute ammonium hydroxide to give a 76% yield of 6-chloro-7-sulfamyl-1,2,4-benzothiadiazine-1,1-dioxide, M.P. 330° C.

EXAMPLE 2

By replacing the 5-chloro-2,4-disulfamylaniline employed in Example 1 by an equimolecular quantity of 5-trifluoro-methyl-2,4-disulfamylaniline and following substantially the same procedure described in Example 1 there is obtained 6-trifluoromethyl-7-sulfamyl-1,2,4-benzothiadiazine-1,1-dioxide.

EXAMPLE 3

A solution of 5-methyl-2,4-disulfamylaniline (0.04 mole) in 50 ml. of dimethylacetamide, chloral hydrate (0.02 mole) and a trace, approximately (0.08 mole), of trimethylamine is heated on the steam bath for 5 hours. Water (100 ml.) is added and 6-methyl-7-sulfamyl-1,2,4-benzothiadiazine-1,1-dioxide is reprecipitated from dilute ammonium hydroxide.

EXAMPLE 4

A solution of 5-nitro-2,4-disulfamylaniline in 60 ml. of dimethylformamide, chloral alcoholate (0.12 mole) and a trace of sodium hydroxide (approximately 0.08 mole) is heated on the steam bath for 3½ hours. Water (100 ml.) is added and the 6-nitro-7-sulfamyl-1,2,4-benzothiadiazine-1,1-dioxide compound is reprecipitated from dilute ammonium hydroxide.

EXAMPLES 5 THROUGH 11

By replacing the 5-chloro-2,4-disulfamylaniline employed in Example 1 by an equimolecular quantity of one of the following compounds:

Ex. No.:
(5) 5-methoxy-2,4-disulfamylaniline,
(6) 5-chloro - 2 - sulfamyl - 4-(N-methylsulfamyl) aniline,
(7) 5-chloro-2-(N-methylsulfamyl)-4 - sulfamylaniline,
(8) 2,4-disulfamylaniline,
(9) 5-chloro-6-methyl-2,4-disulfamylaniline,
(10) 5-fluoro-2,4-disulfamylaniline,
(11) 5-bromo-2,4-disulfamylaniline, and following substantially the same procedure described in Example 1, there is obtained:

Ex. No.:
- (5) 6-methoxy-7-sulfamyl-1,2,4-benzothiadiazine-1,1-dioxide,
- (6) 6-chloro-7-(N-methylsulfamyl)-1,2,4-benzothiadiazine-1,1-dioxide,
- (7) 2-methyl-6-chloro-7-sulfamyl-1,2,4-benzothiadiazine-1,1-dioxide,
- (8) 7-sulfamyl-1,2,4-benzothiadiazine-1,1-dioxide,
- (9) 5-methyl-6-chloro-7-sulfamyl-1,2,4-benzothiadiazine-1,1-dioxide,
- (10) 6-fluoro-7-sulfamyl-1,2,4-benzothiadiazine-1,1-dioxide,
- (11) 6-bromo-7-sulfamyl-1,2,4-benzothiadiazine-1,1-dioxide.

While the above examples illustrate specific conditions for the preparation of 1,2,4-bezothiadiazine-1,1-dioxide compounds, it is to be understood modifications can be made in the reaction conditions described in the examples without departing from the scope of the invention as defined by the appended claims.

What is claimed is:

1. A process wherein disulfamylaniline compounds having one sulfamyl group in ortho-position to the amino group and having at least one additional substituent attached to the benzene ring selected from the group consisting of halogen, lower alkyl, lower alkoxy and nitro is heated with chloral in the presence of a trace amount of base to give a 1,2,4-benzothiadiazine-1,1-dioxide compound having a sulfamyl group and at least one additional substituent selected from the group consisting of halogen, lower alkyl, lower alkoxy, and nitro attached to its benzene moiety.

2. A process wherein 5-chloro-2,4-disulfamylaniline is heated with chloral in the presence of dimethylformamide and a trace amount of potassium fluoride to give 6-chloro-7-sulfamyl-1,2,4-benzothiadiazine-1,1-dioxide.

3. A process wherein 5-trifluoromethyl-2,4-disulfamylaniline is heated with chloral in the presence of dimethylformamide and a trace amount of potassium fluoride to give 6-trifluoromethyl-7-sulfamyl-1,2,4-benzothiadiazine-1,1-dioxide.

References Cited in the file of this patent

UNITED STATES PATENTS 3,043,840    Downing et al. _____ July 10, 1962

OTHER REFERENCES

Novello et al.: Jour. Org. Chemistry, vol. 25, pages 970–980 (1960).

Bergman: The Chemistry of Acetylene and Related Compounds, page 80, Interscience Publishers Inc., N.Y. 1948.